US006506114B1

(12) United States Patent
Estes et al.

(10) Patent No.: US 6,506,114 B1
(45) Date of Patent: Jan. 14, 2003

(54) OBJECT DROP FEATURE FOR A GAMING MACHINE

(75) Inventors: Brandon C. Estes, Chicago, IL (US); Michael W. Mastropietro, Chicago, IL (US); Eric M. Pryzby, Skokie, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 09/878,619

(22) Filed: Jun. 11, 2001

(51) Int. Cl.[7] .................................................. A63F 13/00

(52) U.S. Cl. ............................ 463/16; 463/20; 463/21; 463/25; 273/138.1; 273/139

(58) Field of Search ............................ 463/20, 25, 16, 463/21, 30; 273/138.1, 139

(56) References Cited

U.S. PATENT DOCUMENTS

| | | | | |
|---|---|---|---|---|
| 5,882,261 A | | 3/1999 | Adams | 463/20 |
| 6,047,963 A | * | 4/2000 | Pierce et al. | 273/121 B |
| 6,089,978 A | * | 7/2000 | Adams | 463/20 |
| 6,139,013 A | | 10/2000 | Pierce et al. | 273/121 B |
| 6,159,097 A | * | 12/2000 | Gura | 463/20 |
| 6,220,593 B1 | | 4/2001 | Pierce et al. | 273/138.1 |
| 6,231,442 B1 | * | 5/2001 | Mayeroff | 463/20 |
| 6,254,481 B1 | * | 7/2001 | Jaffe | 463/20 |
| 6,270,411 B1 | * | 8/2001 | Gura et al. | 463/20 |
| 6,336,863 B1 | * | 1/2002 | Baerlocher et al. | 463/27 |
| 6,340,158 B2 | * | 1/2002 | Pierce et al. | 273/138.1 |
| 6,347,996 B1 | * | 2/2002 | Gilmore et al. | 463/17 |
| 6,358,146 B1 | * | 3/2002 | Adams | 463/20 |
| 6,358,147 B1 | * | 3/2002 | Jaffe et al. | 463/20 |
| 6,364,766 B1 | * | 4/2002 | Anderson et al. | 463/16 |
| 6,375,570 B1 | * | 4/2002 | Poole | 463/31 |

FOREIGN PATENT DOCUMENTS

| | | | |
|---|---|---|---|
| WO | WO 00/30727 | 6/2000 | A63F/7/02 |

OTHER PUBLICATIONS

Article, "Eureka! Silicon Gaming"; *Strictly Slots*, 1 page, Oct., 1999.

* cited by examiner

*Primary Examiner*—Henry C. Yuen
*Assistant Examiner*—Frederick C. Nicolas

(57) ABSTRACT

A chance game feature for a gaming machine is controlled by a processor in response to a wager. The feature comprises a matrix, a plurality of moving targets, and an object. The matrix defines an entrance end, an exit end, and a plurality of paths extending between the entrance end and the exit end. The moving targets are proximate the exit end. The object traverses one of the paths and is received by one of the targets. The receiving target is randomly selected from among the plurality of targets prior to the object traversing the one of the paths. A position of the receiving target when the object reaches the exit end is calculated, and one of the paths that lead to the position of the receiving target is randomly selected. A payout is awarded based on the receiving target.

24 Claims, 5 Drawing Sheets

OBJECT DROP FEATURE FOR A GAMING MACHINE

FIELD OF THE INVENTION

The present invention relates generally to gaming machines for playing games of chance and, more particularly, to an object drop feature for a gaming machine.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features for bonus games to satisfy the demands of players and operators. Preferably, such new bonus game features will maintain, or even further enhance, the level of player excitement offered by bonus games heretofore known in the art. The present invention is directed to satisfying these needs.

SUMMARY OF THE INVENTION

A change game feature for a gaming machine is controlled by a processor in response to a wager. The feature comprises a matrix, a plurality of moving targets, and an object. The matrix defines an entrance end, an exit end, and a plurality of paths extending between the entrance end and the exit end. The moving targets are proximate the exit end. The object traverses one of the paths and is received by one of the targets. The receiving target is randomly selected from among the plurality of targets prior to the object traversing the one of the paths. A position of the receiving target when the object reaches the exit end is calculated, and one of the paths that lead to the position of the receiving target is randomly selected. A payout is awarded based on the receiving target.

BRIEF DESCRIPTION OF THE DRAWINGS

The foregoing and other advantages of the invention will become apparent upon reading the following detailed description and upon reference to the drawings in which.

Figure 1:
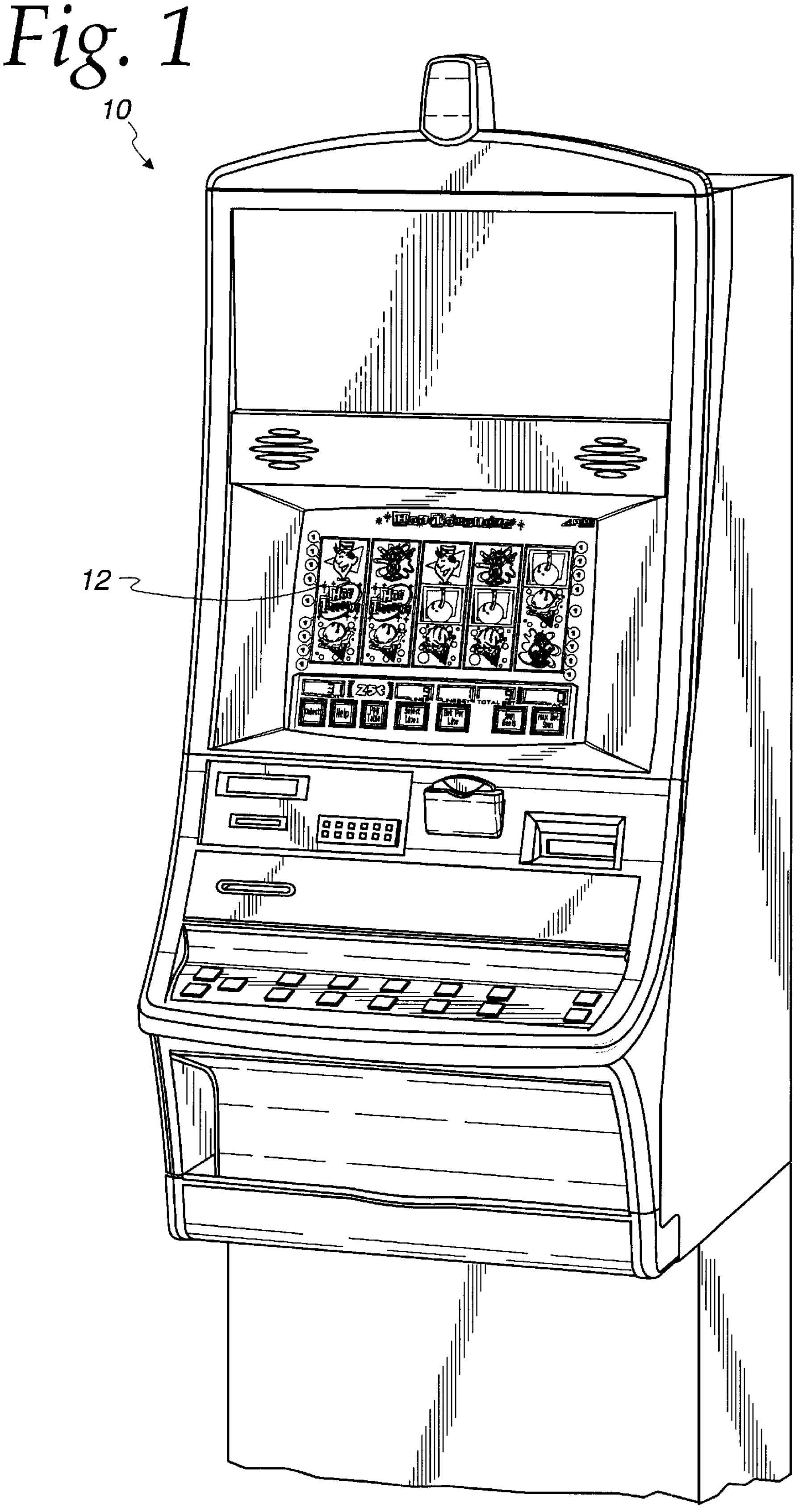
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a gaming machine 10 executing a game of chance including a cherry drop bonus feature according to the present invention. The gaming machine 10 includes a visual display 12 preferably in the form of a dot matrix, CRT, LED, LCD, electro-luminescent or other type of video display known in the art. The display 12 preferably includes a touch screen overlaying the monitor. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

In one embodiment, the gaming machine 10 is operable to play a game of chance entitled HOT TOPPINGS having an ice cream parlor theme. The HOT TOPPINGS game features a basic slot game with five simulated spinning reels and one or more bonus games triggered by respective start-bonus outcomes in the basic game. It will be appreciated, however, that the gaming machine 10 may be implemented with themes other than an ice cream parlor.

Figure 2:
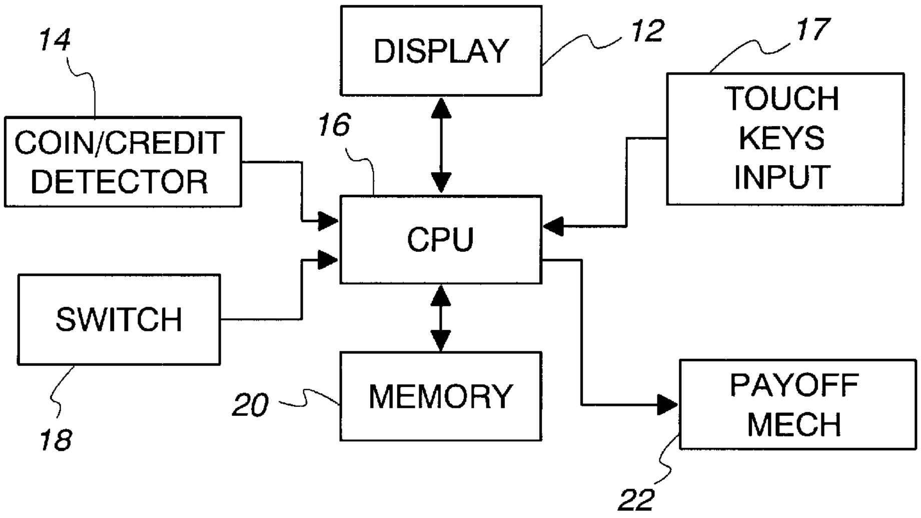
FIG. 2 is a block diagram of a control system suitable for operating the gaming machine.

FIG. 2 is a block diagram of a control system suitable for operating the gaming machine 10. Coin/credit detector 14 signals a central processing unit ("CPU") 16 when a player has inserted a number of coins or played a number of credits. Then, the CPU 16 operates to execute a game program that causes the display 12 to display the basic game that includes simulated symbol-bearing reels. The player may select the number of pay lines to play and the amount to wager via touch screen input keys 17. The basic game commences in response to the player activating a switch 18 (e.g., by pulling a lever or pushing a button), causing the CPU 16 to set the reels in motion, randomly select a game outcome, and then stop the reels to display symbols corresponding to the pre-selected game outcome. In one embodiment, one of the basic game outcomes causes the CPU 16 to enter a bonus mode whereby the display 12 shows a bonus game with animation of a cherry dropped down a sundae dish matrix.

A system memory 20 stores control software, operational instructions and data associated with the gaming machine 10. In one embodiment, the memory 20 comprises a separate read-only memory (ROM) and battery-backed random-access memory (RAM). However, it will be appreciated that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes which might occur in the basic or bonus games. The payoff amounts corresponding to certain combinations of symbols in the basic game is predetermined according to a pay table stored in system memory 20. The payoff amounts corresponding to certain outcomes of the bonus game are also stored in system memory 20.

Figure 3:
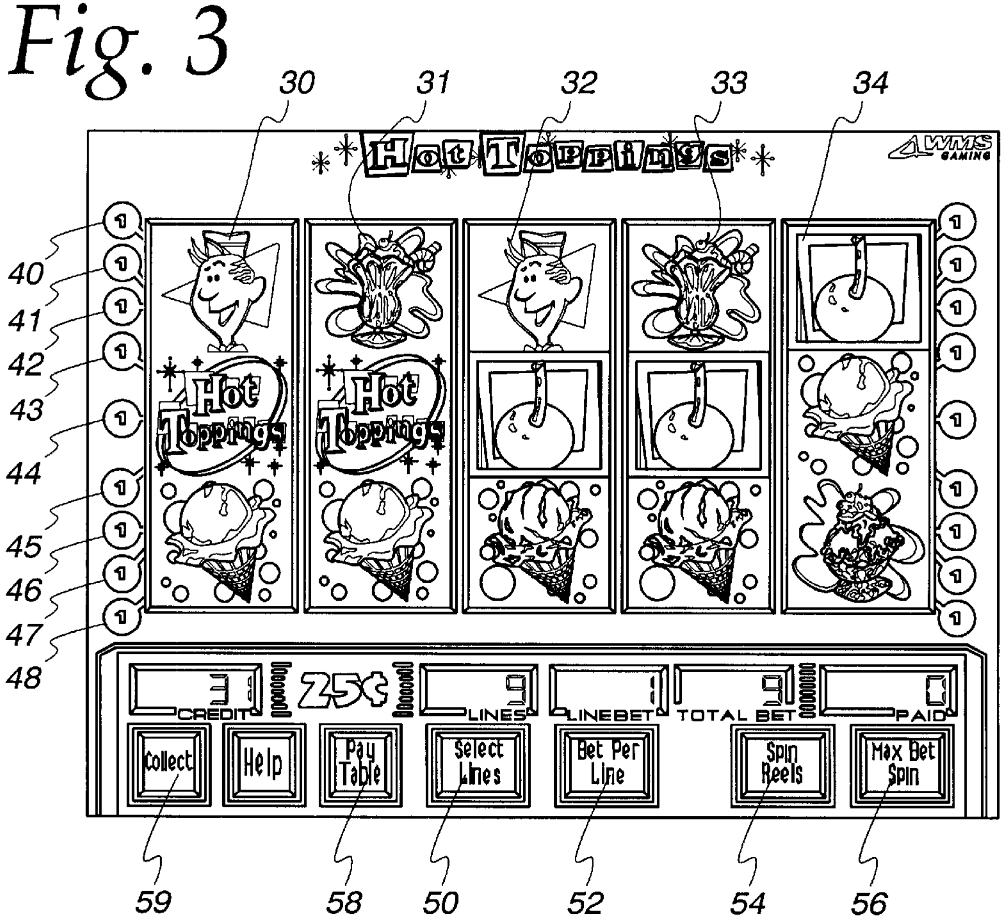
FIG. 3 is a display screen capture showing a start-bonus symbol combination in a basic slot game for triggering a cherry drop bonus feature.

As shown in FIG. 3, the HOT TOPPINGS basic game is implemented on the display 12 on five video simulated spinning reels 30–34 with nine pay lines 40–48. Each of the pay lines 40–48 extends through one symbol on each of the five reels 30–34. Generally, game play is initiated by inserting a number of coins or playing a number of credits, causing the CPU 16 (FIG. 2) to activate a number of pay lines corresponding to the number of coins or credits played. In one embodiment, the player selects the number of pay lines (between one and nine) to play by pressing a "Select Lines" key 50 on the video display 12. The player then chooses the number of coins or credits to bet on the selected pay lines by pressing the "Bet Per Line" key 52.

After activation of the pay lines, the reels 30–34 may be set in motion by touching the "Spin Reels" key 54 or, if the player wishes to bet the maximum amount per line, by using the "Max Bet Spin" key 56 on the video display 12. Alternatively, other mechanisms such as, for example, a lever or push button may be used to set the reels in motion. The CPU 16 uses a random number generator to select a game outcome (e.g., "basic" game outcome) corresponding to a particular set of reel "stop positions." The CPU 16 then causes each of the video reels 30–34 to stop at the appropriate stop position. Video symbols are displayed on the reels 30–34 to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30–34 along an active pay line correspond to one of the winning combinations on the pay table. A winning combination, for example, could be three or more CHOCOLATE CONE symbols along an active pay line, where the award is greater as the number of CHOCOLATE CONE symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing the "Collect" button 59. In one implementation, the winning combinations start from the first reel 30 (left to right) and span adjacent reels. In an alternative implementation, the winning combinations start from either the first reel 30 (left to right) or the fifth reel 34 (right to left) and span adjacent reels.

Included among the plurality of basic game outcomes is a start-bonus outcome for triggering play of a bonus game. A start-bonus outcome may be defined in any number of ways. For example, a start-bonus outcome occurs when a special start-bonus symbol or a special combination of symbols appears on one or more of the reels 30–34. The start-bonus outcome may require the combination of symbols to appear along an active pay line, or may alternatively require that the combination of symbols appear anywhere on the display regardless of whether the symbols are along an active pay line. The appearance of a start-bonus outcome causes the CPU to shift operation from the basic game to the bonus game.

Figure 4:
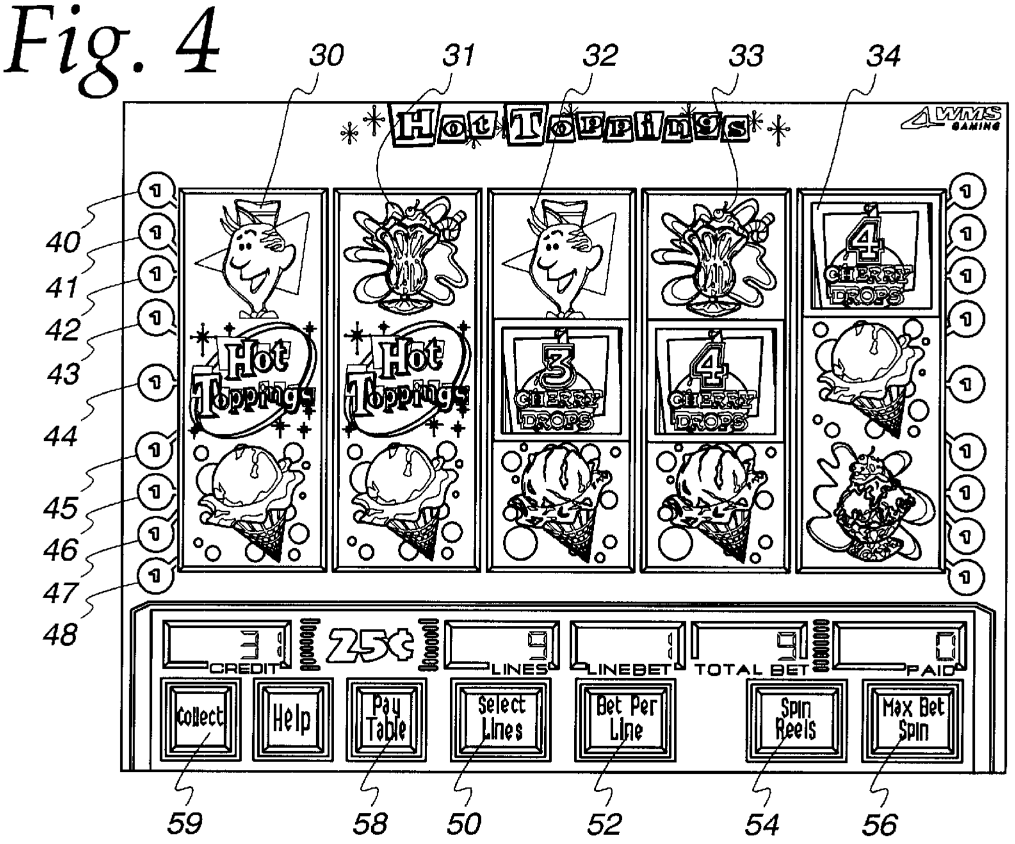
FIG. 4 is a display screen capture feature, responsive to a player's selection of one of the symbols in the start-bonus combination, showing a number of cherry drops to be exercised in the cherry drop bonus feature.

Three or more CHERRY symbols anywhere on the display trigger a cherry drop bonus feature. In FIG. 3, three CHERRY symbols are depicted on the display. In response to triggering the cherry drop bonus feature, the CHERRY symbols begin to animate and swing back and forth. The player is prompted to touch one of the CHERRY symbols. As shown in FIG. 4, the touched CHERRY symbol reveals a number of cherries (e.g., 4 cherry drops) to be dropped down a sundae dish matrix in the cherry drop bonus feature. The non-selected CHERRY symbols reveal what the player would have received had the player selected those symbols.

Figure 5:
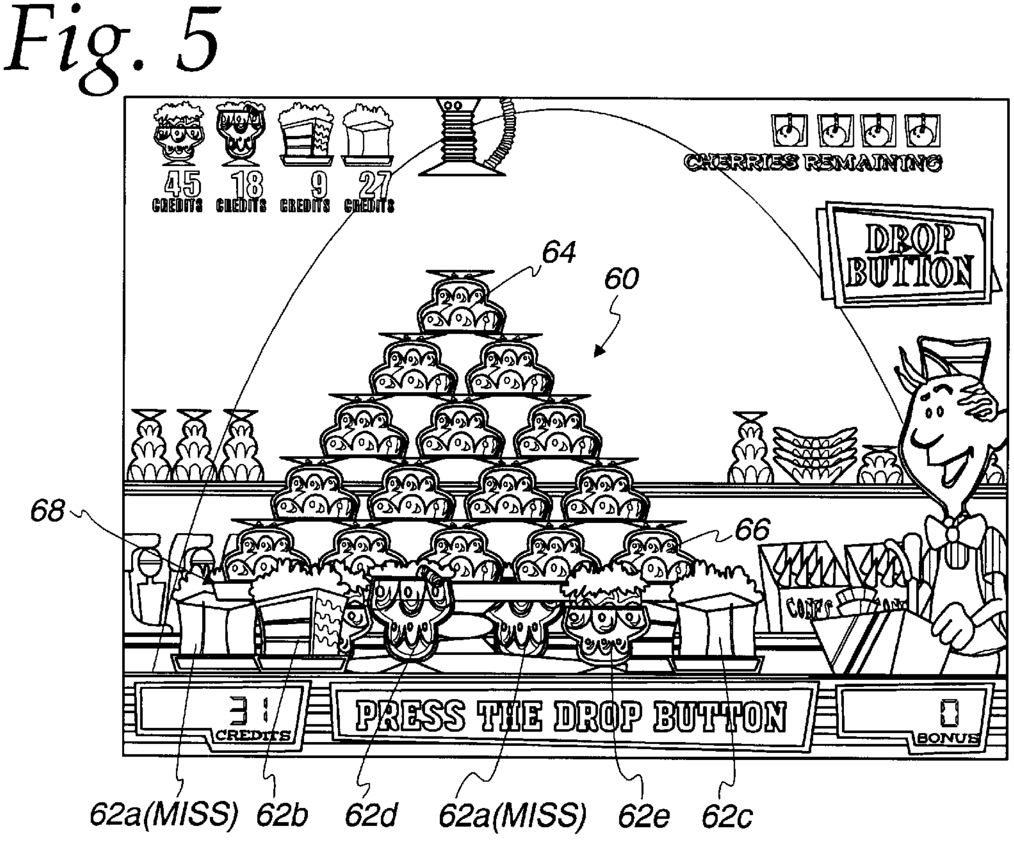
FIGS. 5 through 9 are display screen captures showing the cherry drop bonus feature.

Referring to FIG. 5, the video display then depicts a matrix 60 and a plurality of moving targets 62*a*, 62*b*, 62*c*, 62*d*, and 62*e* (collectively referred to as "62"). The matrix 60 is preferably in the form of a pyramid of stacked sundae glasses have a single glass 64 at its top and five glasses 66 at its base. The top glass 64 defines an entrance end to the pyramid 60, while the base glasses 66 lead to an exit end 68 of the pyramid 60. A plurality of paths extend between the top glass 64 and the exit end 68.

The moving targets 62 are proximate the exit end 68 of the pyramid 60. The moving targets 62 are preferably in the form of eight desserts and four Misses 62*a* (blank/empty areas) on a revolving carousel. The eight desserts include two Cakes 62*b*, two Gelatins 62*c*, two Malts 62*d*, and two Sundaes 62*e*. The desserts are arranged so that at any given time one of each type of dessert 62*b*, 62*c*, 62*d*, and 62*e* and two Misses 62*a* are located in front of the pyramid 60 and visible to the player, while the remaining four desserts and two Misses are behind the pyramid 60.

Figure 9:
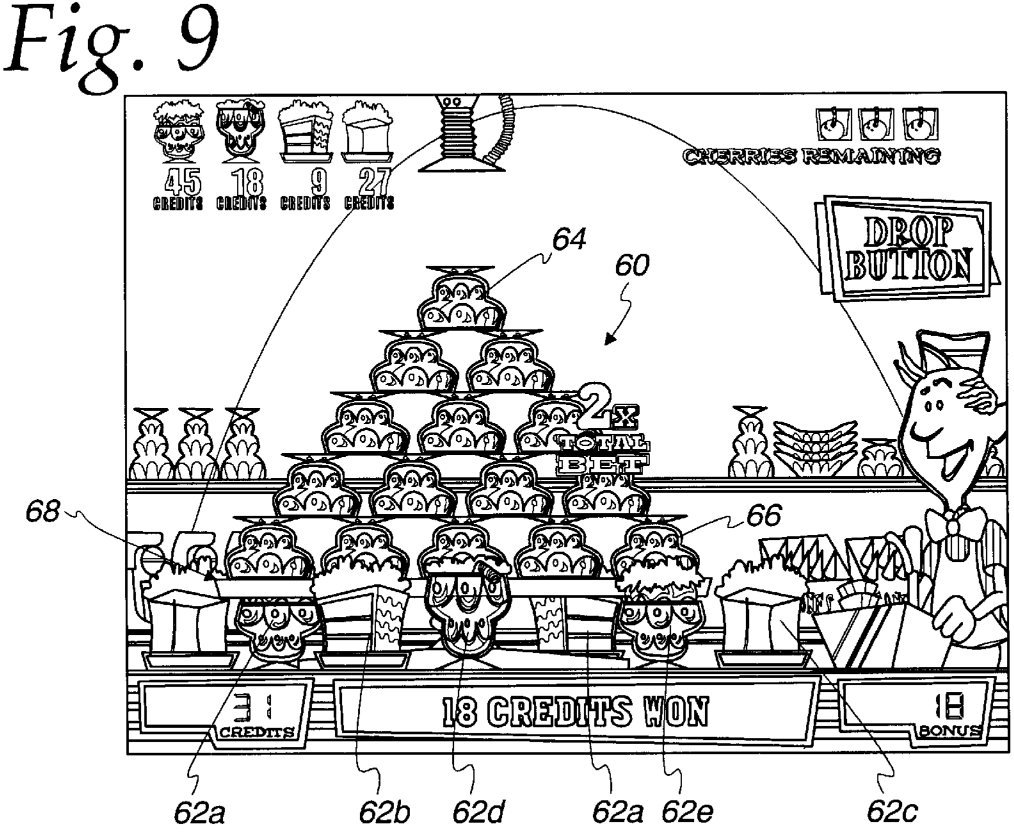

To the right of the pyramid 60 is Stan the Ice Cream Man adjacent to his cherry drop machine controls, and above Stan is a "Drop" cherry touch key. In response to the "Drop" key being pressed by the player, Stan animates to operate his controls and drop a cherry out of the machine onto the top glass 64 of the pyramid 60. As shown in FIGS. 6, 7, 8, and 9, the dropped cherry 70 bounces down the pyramid 60 toward the exit end 68. If the cherry 70 lands on a dessert 62*b*, 62*c*, 62*d*, or 62*e* (as opposed to a Miss 62*a*), the CPU awards a multiplier based on which dessert the cherry 70 landed. In FIG. 9, for example, the CPU awards a multiplier of 2 for a cherry landing on the Cake 62*b* in FIG. 8. The above process a dropping a cherry 70 down the pyramid 60 and onto either a dessert or a Miss is repeated until the player uses up all of the awarded number of drops. The final multiplier for the cherry drop bonus feature is equal to the sum of the individual multipliers awarded for each cherry drop, plus a "gratuity" multiplier equal to the number of drops the player received. This final multiplier is multiplied by the player's original wager for playing the basic slot game to generate a bonus credit amount.

The CPU executes the cherry drop bonus feature as follows. First, to associate a number of drops with each CHERRY symbol in FIGS. 3 and 4, the CPU randomly selects an entry from the following drop table for each CHERRY symbol:

| | | |
|---|---|---|
| 3 | 3 | 3 |
| 4 | 4 | 5 |

In the table, each entry represents a number of cherry drops. Because three drops appears in three out of six entries in the drop table, the probability that a CHERRY symbol will be associated with three drops is 50 percent. Because four drops appears in two out of six entries in the drop table, the probability that a CHERRY symbol will be associated with four drops is approximately 33.33 percent. Finally, because five drops appears in one out of six entries in the drop table, the probability that a CHERRY symbol will be associated with one drop is approximately 16.67 percent.

Second, in response to the "Drop" cherry key being pressed by the player in FIG. 5 but prior to the cherry 70 dropping through the pyramid 60, the CPU randomly selects an entry from the following dessert table to determine on which of the moving targets 62 the cherry 70 will land:

| | | | | |
|---|---|---|---|---|
| $Miss_1$ | Sundae | Cake | Gelatin | Malt |
| $Miss_2$ | Sundae | Cake | Gelatin | Malt |

Because each type of target appears in two out of ten entries in the dessert table, the probability that the cherry 70 will land on each type of target is 20 percent. In the dessert table, each possible moving target 62 is associated with a multiplier that varies depending upon the number of CHERRY symbols that triggered the cherry drop bonus feature. These multipliers are shown in the following multiplier table:

| | 3 CHERRY | 4 CHERRY | 5 CHERRY |
|---|---|---|---|
| Miss | 0 | 0 | 0 |
| Cake | 2 | 4 | 10 |
| Gelatin | 2 | 4 | 10 |
| Malt | 3 | 5 | 20 |
| Sundae | 4 | 10 | 40 |

For example, if three CHERRY symbols triggered the cherry drop bonus feature as in FIGS. 3 and 4, the Miss 62*a* is associated with a multiplier of 0, the Cake 62*b* is associated with a multiplier of 2, the Gelatin 62*c* is associated with a multiplier of 2, the Malt 62*d* is associated with a multiplier of 3, and the Sundae 62*e* is associated with a multiplier of 4. The greater the number of triggering CHERRY symbols, the greater the multiplier for each dessert.

At any given time, each type of moving target 62 and its associated multiplier is always available because of the manner in which the targets 62 are arranged. The targets 62 are arranged in the following sequence: Gelatin, $Miss_1$, Cake, Malt, $Miss_2$, Sundae, Gelatin, $Miss_1$, Cake, Malt, $Miss_2$, and Sundae. At the exit end 68 of the pyramid 60, there are six target positions on which the cherry 70 can land. Based on the foregoing sequence, it can be seen that, at any given time, these six target positions are occupied by two Misses 62*a* (i.e. $Miss_1$ and $Miss_2$) and one of each type of dessert 62*b*, 62*c*, 62*d*, and 62*e*. The two Misses 62*a* are treated separately in the dessert table and the target sequence as $Miss_1$ and $Miss_2$ so that if either $Miss_1$ or $Miss_2$ is selected by the CPU from the dessert table, the dropped cherry 70 will be directed to the selected one of $Miss_1$ and $Miss_2$.

Figure 6:
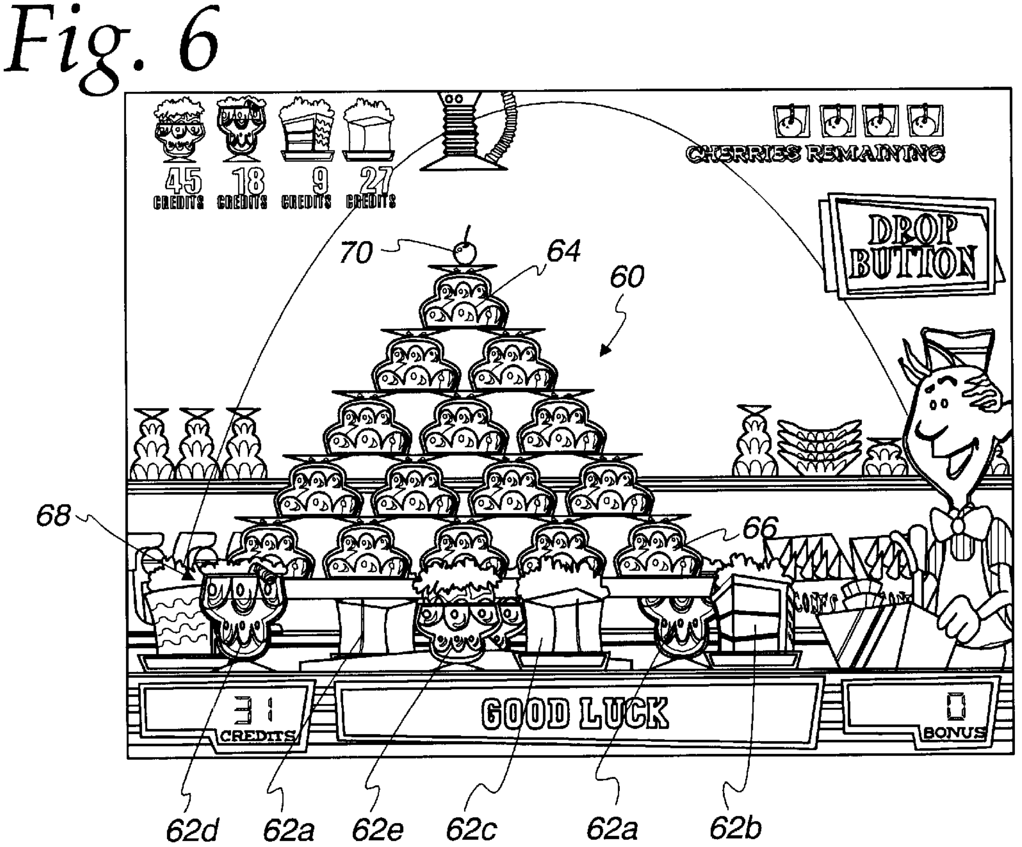
Figure 7:
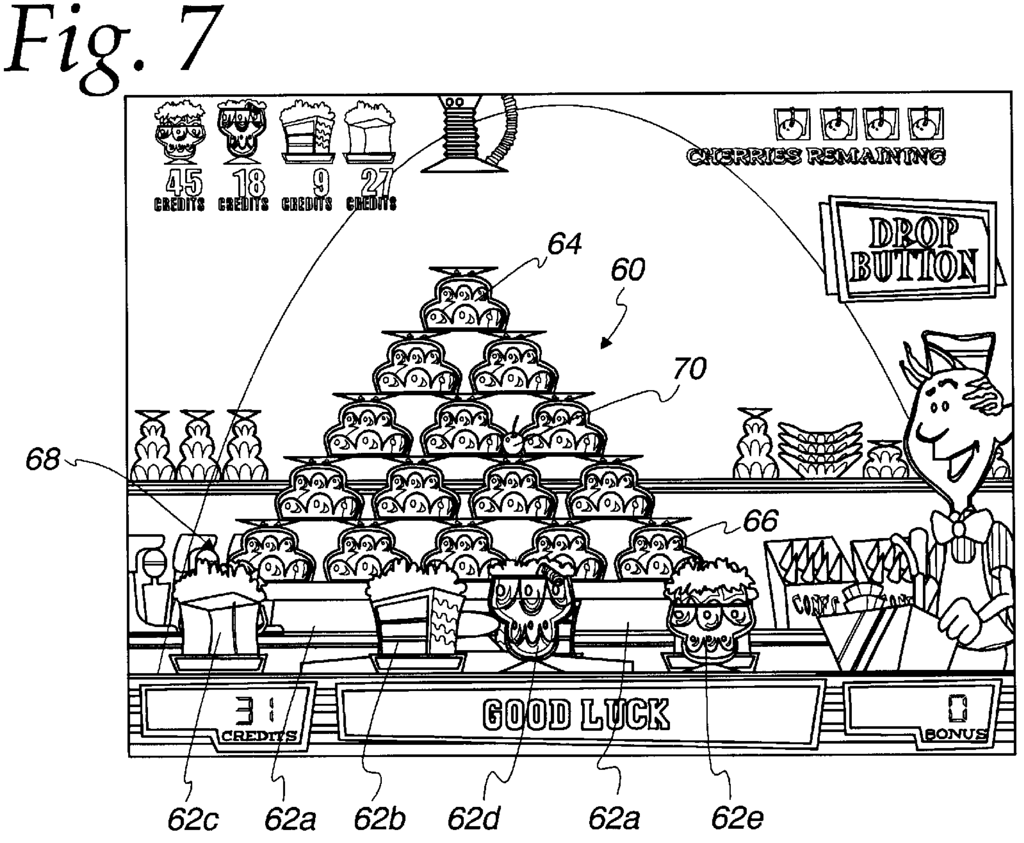
Figure 8:
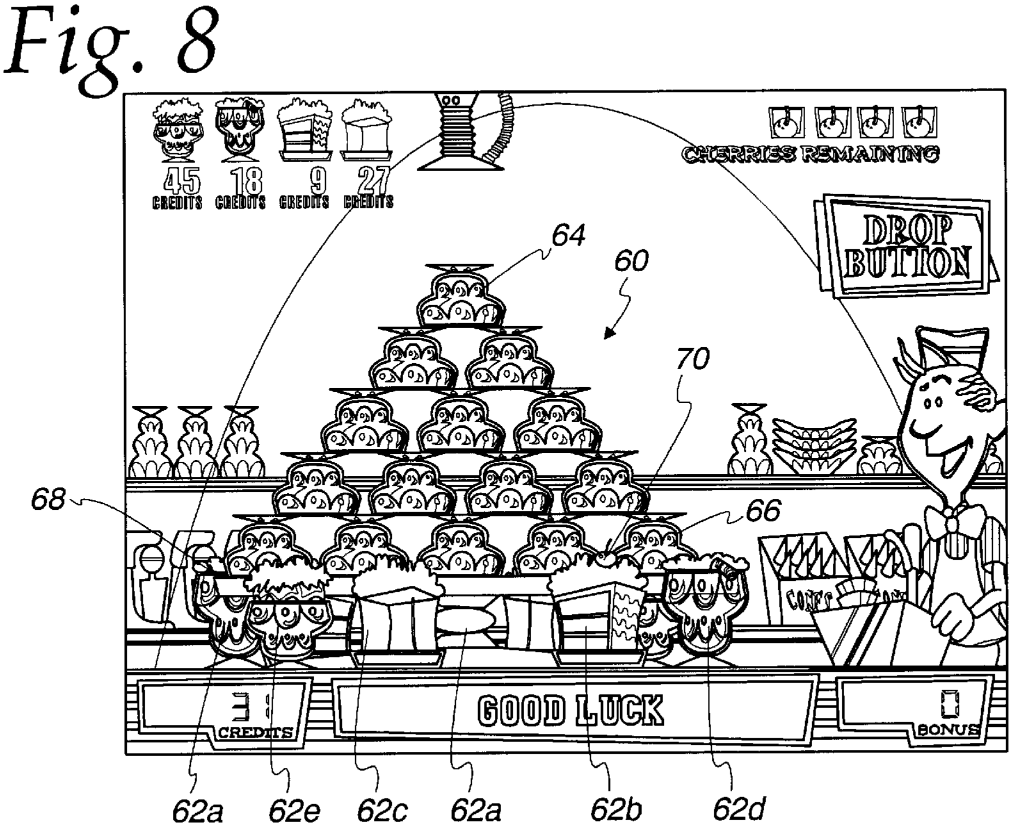

Third, after the CPU randomly selects one of the moving targets 62 on which the cherry 70 will land, the CPU calculates the position in front of the pyramid 60 of the selected target 62 at the time the cherry 70 reaches the exit end 68. This calculation may be illustrated with an example in which the selected target 62 is the Cake 62*b*. Referring to FIG. 6, the cherry 70 may, for example, require 50 frames of animation to travel from the top glass 64 of the pyramid 60 to any of the six target positions at the exit end 68 of the pyramid 60. In 50 frames of animation, each target 62 may traverse just over five target positions at the exit end 68 of the pyramid 60. Therefore, if the Cake 62*b* is the selected target and is about to be located at the first (leftmost) target position when the cherry 70 begins its descent from the top glass 64 (note the Cake 62*b* trailing the Malt 62*d*), the Cake 62*b* will be located at the fifth (second from rightmost) target position when the cherry 70 reaches the exit end 68 of the pyramid 60. Therefore, in the illustrated example, the calculated position when the cherry 70 reaches the exit end 68 is just over five target positions ahead of the position of the selected target 62 at the time the cherry 70 begins its descent down the pyramid 60. Of course, if the selected target 62 will no longer be visible after it travels five target positions, the CPU instead calculates the position of the selected target's matching counterpart (there are pair of each type of target 62 and one of each pair is visible at any given time) at the time the cherry 70 reaches the exit end 68 of the pyramid 60.

Fourth, after the CPU calculates the target position of the selected target 62 at the time the cherry 70 reaches the exit end 68, the cherry 70 animates down the pyramid 60 to this target position via a path chosen at random from all paths leading to this target position. In the illustrated example, the CPU randomly selects one of five paths (shown in dotted lines in FIG. 8) leading to the fifth target position.

While the present invention has been described with reference to one or more particular embodiments, those skilled in the art will recognize that many changes may be made thereto without departing from the spirit and scope of the present invention. For example, instead of simulating the reels on a video display, the reels may be mechanical and driven by respective stepper motors. If the reels are mechanical, the bonus game is animated on a separate video display. Each of these embodiments and obvious variations thereof is contemplated as falling within the spirit and scope of the claimed invention, which is set forth in the following claims.

What is claimed is:

1. A chance game feature for a gaming machine controlled by a processor in response to a wager, comprising:

a matrix defining an entrance end, an exit end, and a plurality of paths extending between the entrance end and the exit end;

a plurality of targets proximate the exit end;

an object traversing one of the plurality of paths and being received by one of the plurality of targets;

target selection means for randomly selecting, prior to the object traversing the one of the plurality of paths, which one of the plurality of targets will receive the object; and payout means for awarding a payout based on the receiving one of the plurality of targets.

2. The game feature of claim 1, further including path selection means for randomly selecting one of any of the plurality of paths that lead to the receiving one of the plurality of targets.

3. The game feature of claim 2, wherein the plurality of targets are moving, and further including means for calculating a position of the receiving one of the plurality of moving targets when the object reaches the exit end.

4. The game feature of claim 1, wherein the matrix is shaped as a pyramid with only one entrance at the entrance end.

5. A chance game feature for a gaming machine controlled by a processor in response to a wager, comprising:

a matrix defining an entrance end, an exit end, and a plurality of paths extending between the entrance end and the exit end;

a plurality of targets proximate the exit end;

an object traversing one of the plurality of paths and being received by one of the plurality of targets;

target selection means for randomly selecting the receiving one of the plurality of targets from among the plurality of targets prior to the object traversing the one of the plurality of paths; and payout means for awarding a payout based on the receiving one of the plurality of targets;

wherein the plurality of targets are moving, and further including means for calculating a position of the receiving one of the plurality of moving targets when the object reaches the exit end.

6. The game feature of claim 5, further including path selection means for randomly selecting one of any of the plurality of paths that lead to the position of the receiving one of the plurality of moving targets.

7. A method of operating a chance game feature for a gaming machine controlled by a processor in response to a wager, the method comprising:

providing a matrix defining an entrance end, an exit end, and a plurality of paths extending between the entrance end and the exit end;

providing a plurality of targets proximate the exit end;

randomly selecting one of the plurality of targets from among the plurality of targets;

after randomly selecting the one of the plurality of targets, depicting an object traversing one of the plurality of paths and being received by the selected one of the plurality of targets; and awarding a payout based on the selected one of the plurality of targets.

8. The method of claim 7, further including randomly selecting one of any of the plurality of paths that lead to the selected one of the plurality of targets.

9. The method of claim 8, wherein the plurality of targets are moving, and further including calculating a position of the selected one of the plurality of moving targets when the object reaches the exit end.

10. The method of claim 7, wherein the matrix is shaped as a pyramid with only one entrance at the entrance end.

11. A method of operating a chance game feature for a gaming machine controlled by a processor in response to a wager, the method comprising:

providing a matrix defining an entrance end, an exit end, and a plurality of paths extending between the entrance end and the exit end;

providing a plurality of targets proximate the exit end;

randomly selecting one of the plurality of targets from among the plurality of targets;

after randomly selecting the one of the plurality of targets, depicting an object traversing one of the plurality of paths and being received by the selected one of the plurality of targets; and awarding a payout based on the selected one of the plurality of targets;

wherein the plurality of targets are moving, and further including calculating a position of the selected one of the plurality of moving targets when the object reaches the exit end.

12. The method of claim 11, further including randomly selecting one of any of the plurality of paths that lead to the position of the selected one of the plurality of moving targets.

13. A chance game feature for a gaming machine controlled by a processor in response to a wager, comprising:

a matrix defining an entrance end, an exit end, and a plurality of paths extending between the entrance end and the exit end;

a plurality of moving targets proximate the exit end;

an object traversing one of the plurality of paths and being received by one of the plurality of moving targets; and payout means for awarding a payout based on the receiving one of the plurality of moving targets.

14. The game feature of claim 13, further including target selection means for randomly selecting the receiving one of the plurality of moving targets from among the plurality of moving targets.

15. The game feature of claim 14, wherein the target selection means randomly selects the receiving one of the plurality of moving targets prior to the object traversing the one of the plurality of paths.

16. The game feature of claim 15, further including means for calculating a position of the receiving one of the plurality of moving targets when the object reaches the exit end.

17. The game feature of claim 16, further including path selection means for randomly selecting one of any of the plurality of paths that lead to the position of the receiving one of the plurality of moving targets.

18. The game feature of claim 13, wherein the matrix is shaped as a pyramid with only one entrance at the entrance end.

19. A method of operating a chance game feature for a gaming machine controlled by a processor in response to a wager, comprising:

providing a matrix defining an entrance end, an exit end, and a plurality of paths extending between the entrance end and the exit end;

providing a plurality of moving targets proximate the exit end;

depicting an object traversing one of the plurality of paths and being received by one of the plurality of moving targets; and awarding a payout based on the receiving one of the plurality of moving targets.

20. The method of claim 19, further including randomly selecting the receiving one of the plurality of moving targets from among the plurality of moving targets.

21. The method of claim 20, wherein randomly selecting the receiving one of the plurality of moving targets occurs prior to the object traversing the one of the plurality of paths.

22. The method of claim 21, further including calculating a position of the receiving one of the plurality of moving targets when the object reaches the exit end.

23. The method of claim 22, further including randomly selecting one of any of the plurality of paths that lead to the position of the receiving one of the plurality of moving targets.

24. The method of claim 19, wherein the matrix is shaped as a pyramid with only one entrance at the entrance end.

* * * * *